United States Patent [19]

Meuth

[11] Patent Number: 5,444,967
[45] Date of Patent: Aug. 29, 1995

[54] MOWER DECK WASH OUT PORT

[76] Inventor: William I. Meuth, 1316 E. Division St., Evansville, Ind. 47711-5971

[21] Appl. No.: 300,810

[22] Filed: Sep. 6, 1994

[51] Int. Cl.⁶ .................................. A01D 34/82
[52] U.S. Cl. ........................................ 56/12.1
[58] Field of Search ............. 56/12.1, 17.5, 320.1, 56/16.8

[56] References Cited

U.S. PATENT DOCUMENTS

| | | | |
|---|---|---|---|
| 2,936,563 | 5/1960 | Blume . | |
| 2,984,061 | 5/1961 | Stabnau . | |
| 2,992,524 | 7/1961 | Stabnau . | |
| 3,040,990 | 6/1962 | Gotti | 56/12.1 X |
| 3,112,596 | 12/1963 | Price | 56/12.1 |
| 3,214,893 | 11/1965 | Griffin . | |
| 5,027,590 | 7/1991 | Stark . | |

FOREIGN PATENT DOCUMENTS 625488  8/1961  United Kingdom .

Primary Examiner—Michael Powell Buiz
Attorney, Agent, or Firm—Richard C. Litman

[57] ABSTRACT

An assembly for permanent mounting to the deck of a power mower, enabling temporary attachment of a garden hose, for the purpose of washing the mower blade and the underside of the deck. The assembly includes a double female threaded fitting, a pipe nipple threaded to the double threaded fitting and passing through the mower deck, and a tee fitting threaded to the pipe nipple. Lock washers secure the nipple in place to the mower deck. The tee fitting has horizontal members disposed below the deck and above the mower blade. The horizontal members are flattened in profile, to conserve space, and serve as nozzles discharging water onto the rotating blade when cleaning. A hole formed in the tee fitting allows escaping water to dislodge grass clippings from the novel assembly. The cross sectional area of the nozzles is at least equal to the cross sectional area of the other water conducting members, so that heavy, concentrated jets of water strike the rotating blade. Preferably, a threaded cap is installed in the double female member when the garden hose is not connected thereto, so that threads are prevented from clogging with plant clippings during operation of the mower.

6 Claims, 2 Drawing Sheets

MOWER DECK WASH OUT PORT

BACKGROUND OF THE INVENTION

1. FIELD OF THE INVENTION

The present invention relates to an improvement to a power lawn mower of the type having a rotating blade. More specifically, the improvement concerns an arrangement permanently carried aboard the mower enabling connection to a water supply for the purpose of cleaning the underside of the mower of plant cuttings.

2. DESCRIPTION OF THE PRIOR ART

Powered grass mowers have been widely used for many years to maintain lawns at a desired, uniform height. When lawns are cut, clippings and other plant matter tend to accumulate on the walls of the chamber enclosing the rotating blade of the mower. If neglected, the clippings and other matter will obstruct the flow path of air and clippings being discharged from the mower. Also, clippings retain moisture which will cause steel mower decks to rust over time and eventually fail.

One solution to the problem is to maintain the mower by removing clippings. Although this may be performed by manual effort, as by scraping clippings out from the underside of the mower deck with a suitable tool; this method has its drawbacks. The method requires patient attention to every location at which clippings accumulate. Also, in the case of larger mowers, as typified by riding mowers, the equipment is so large and heavy that it is difficult, time consuming, dirty, and perhaps even unsafe to lift a mower to gain necessary access.

Accordingly, the prior art has proposed cleaning the mower by introducing a stream of water onto the rotating blade. A suitable fitting is placed in a hole drilled in the mower deck, and a garden hose or like source of water is connected to the fitting. The water flowing from the hose is dispersed and driven under pressure by the rotating blade. This water removes the objectionable accumulation of clippings from the mower deck.

This approach is illustrated in U.S. Pat. Nos. 2,936,563, issued to Walter S. Blume on May 17, 1960; 2,984,061 and 2,992,524, issued to Roy E. Stabnau on May 16 and Jul. 18, 1961, respectively; 3,214,893, issued to William L. Griffin on Nov. 2, 1965; 5,027,590, issued to Max L. Stark on Jul. 2, 1991; and Canadian Pat. No. 625,488, dated Aug. 15, 1961.

Water flow is directed laterally, from a side wall of the blade chamber, in the devices of Blume, Stark and the Canadian patent.

In the patents to Stabnau and Griffin, and in the Canadian patent, incoming water is diffused or obstructed in various ways. Stabnau employs a water conduit having a plurality of discharge orifices formed therein. Griffin distributes water in manifolded fashion to a plurality of discharge heads located within the blade chamber. Each head has several discharge nozzles.

None of the above inventions and patents, taken either singly or in combination, is seen to describe the instant invention as claimed.

SUMMARY OF THE INVENTION

The present invention comprises an assembly which is permanently mounted to the horizontal, top wall of the mower deck. The assembly makes threaded connection to a garden hose, and distributes the water onto the mower blade below.

In the present invention, water is directed onto the blade from above. No more than two discharge orifices are formed in the discharging head, so that a heavy jet issues therefrom. These orifices are sufficiently large so as not to throttle water flow. The volume of water deflected by the blade is therefore more concentrated, and is thought to work to greater effect.

Removal of clippings accumulating on the novel assembly is accomplished by a small water outlet orifice located in the body or inlet. This keeps the assembly free of clippings as well as the blade of the mower.

In a preferred embodiment, the novel assembly is made up from a section of threaded pipe nipple, a double female threaded fitting screwed onto and above the pipe nipple, and a threaded tee fitting screwed onto and below the pipe nipple. This assembly passes through the deck of the mower, and is secured thereto by lock washers and lock nuts threaded to the pipe nipple. The lock nuts surround the deck and clamp the novel assembly thereto.

When constructed in this manner, the novel assembly is rapidly assembled, and disassembled for replacement of parts or other service, or for transfer to another mower. Conventional, ordinary tools may be employed for assembly and disassembly.

When used for washing the underside of the mower deck, a garden hose is screwed into the double female fitting. Water passes through the assembly and is discharged onto the rotating blade. Propelled under great force by the blade, the water removes plant clippings from the deck and the blade.

The tee fitting provides an advantageous nozzle for delivering a concentrated, heavy jet of, water onto the blades and so that momentum of water flowing through the nozzle is increased. This arrangement avoids excessive or wide dispersion of the jet which otherwise could cause the water to be dispersed less effectively. In a preferred embodiment, the tee fitting has flattened nozzles, so as to occupy less space. This is desirable in mowers wherein the blade is mounted close to the deck, and space is at a premium.

A removable cap is installed in the water discharge fitting to protect threads which mate with corresponding threads formed in a garden hose at all times other than during cleaning of the mower.

Accordingly, it is a principal object of the invention to provide an assembly for distributing water from a water source onto the rotating blade of a power mower, for the purpose of cleaning the underside of the mower deck and the blade of plant clippings.

It is another object of the invention to enable temporary connection of a garden hose to the assembly.

It is a further object of the invention to concentrate water discharged onto the blade in large jets.

Still another object of the invention is to introduce the water from above the mower blade.

A still further object of the invention is to make the nozzle assembly self-cleaning when water pressure is introduced thereto.

An additional object of the invention is to provide a washing fitting which is rapidly assembled.

It is again an object of the invention to protect threads mating with threads of a garden hose.

Yet another object of the invention is to minimize space occupied by that portion of the assembly located below the mower deck and above the blade.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
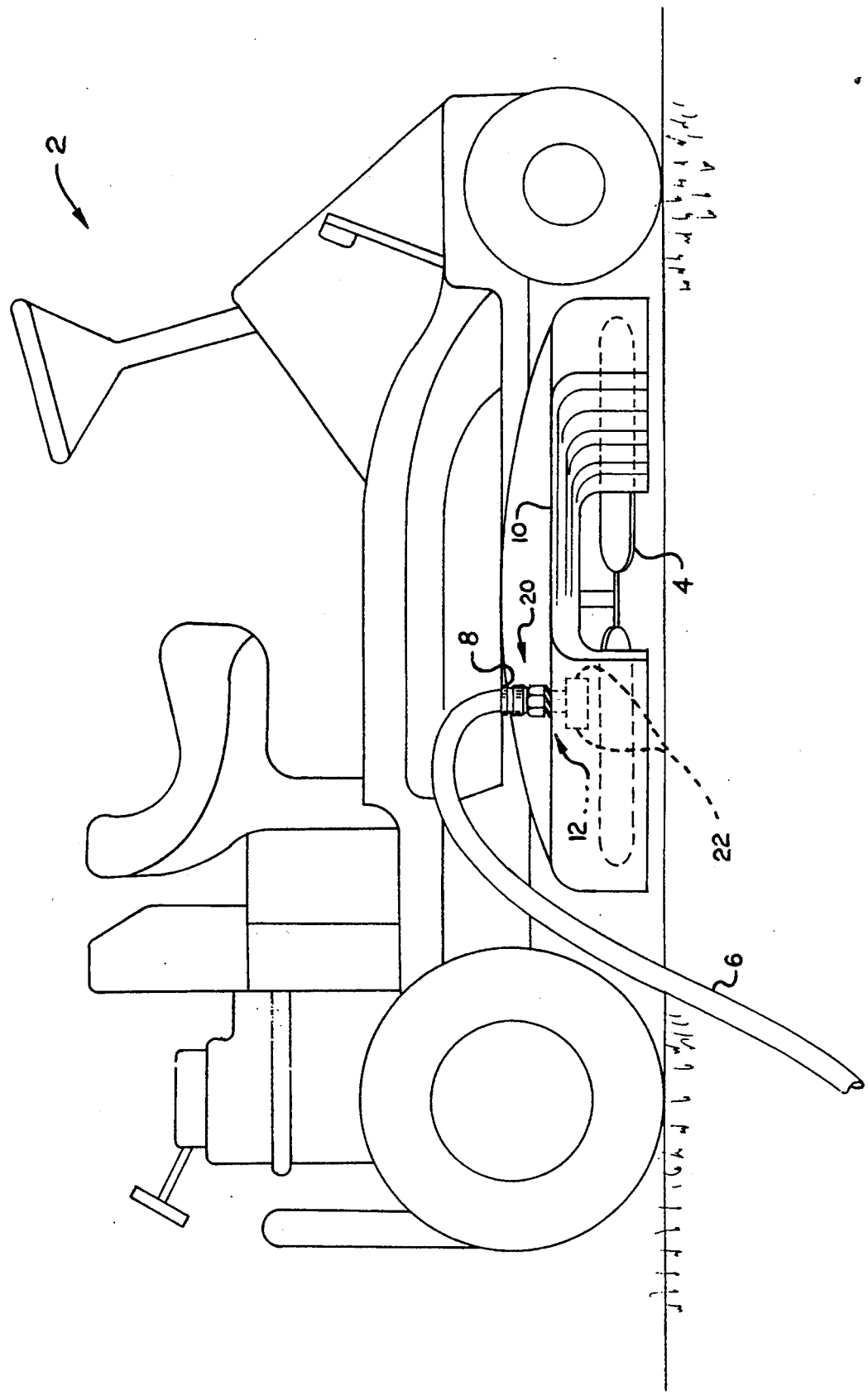
FIG. 1 is an environmental, side elevational view of the invention, showing a garden hose connected for cleaning.

Turning now to FIG. 1 of the drawings, a conventional power mower 2 is fitted with the novel water distributing assembly 20, which provides a conduit for conducting water from a water source to blade 4 of mower 2. A garden hose 6 terminating in a threaded hose fitting 8 serves as a water source, and is shown connected to assembly 20 as would be the case for cleaning.

Assembly 20 is secured to deck 10 of mower 2, passing through a hole 12 formed therein. Nozzles 22 of assembly 20 conduct water coming from garden hose 6. Water is conducted through assembly 20, and is discharged onto blade 4 of mower 2. Although the depiction of FIG. 1 illustrates static conditions, it will be understood that the cleaning operation during which water flows blade 4 is conducted with blade 4 rotating under power.

Figure 2:
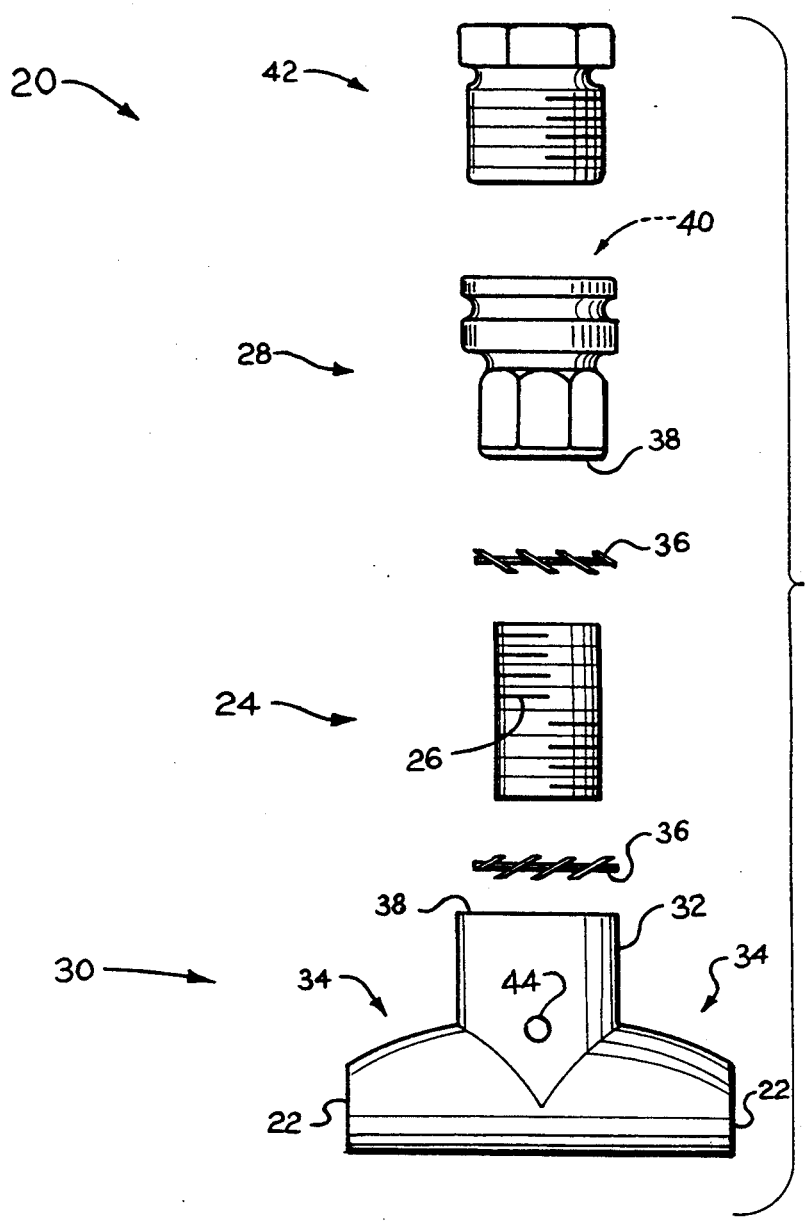
FIG. 2 is an exploded, side elevational view of the components of the invention, drawn to enlarged scale.

FIG. 2 illustrates one possible construction of assembly 20. Water conducting components of assembly 20 include a pipe nipple 24 having male threads 26, a double female threaded fitting 28, and a tee fitting 30 having a threaded female stem member 32 and two cross members 34 providing nozzles 22. Tee fitting 30 has threads formed within stem member 32 for attaching to nipple 24.

Nipple 24 passes through hole 12 formed in deck 10, and is secured in place in vertically disposed within hole 12 by locking hardware represented by lock washers 36. Obviously, if nipple 24 is sufficiently short, then fittings 28 and 30 may be screwed thereonto sufficiently so as to compress lock washers 36 by abutment at respective shoulders 38. If the dimensions and configurations of these components do not permit this arrangement, then separate lock nuts (not shown) may be provided to secure nipple 24 in place.

Fitting 28 is double threaded in that it includes lower threads for attaching to nipple 24 as described above, and upper threads forming a connection port 40. Threads formed in connection port 40 are selected to cooperate with corresponding threads formed on hose fitting 8.

A threaded cap 42 is provided for closing connection port 40 when hose 6 is not connected thereto. Obviously, threads formed in cap 42 are selected to match those formed in fitting 8. Cap 42 contacts and covers threads formed in fitting 8, thereby preventing plant clippings (not shown) from adhering to and clogging these threads.

Assembly 20 may have a tendency to collect grass clippings during mower operation. A water outlet orifice 44 is provided within the conduit body upstream of the nozzles to dislodge clippings from assembly 20 during cleaning. Preferably, orifice 44 faces opposite the direction of blade driven clippings.

Figure 3:
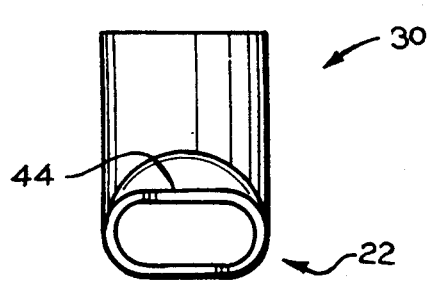
FIGS. 3 and 4 are front elevational views of alternative embodiment water discharge nozzles.
Figure 4:
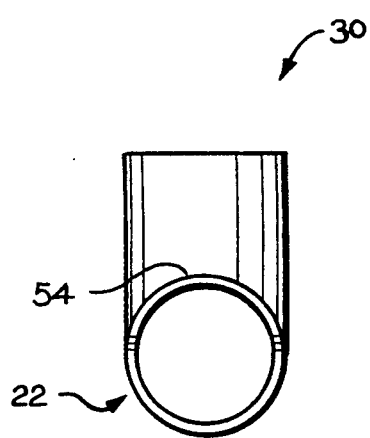

Nozzles 22 are of any suitable configuration, two such configurations being illustrated in FIGS. 3 and 4. One preferred configuration includes a flattened profile 44 shown in FIG. 3. This configuration conserves space existing between blade 4 and deck 10, which space is becoming increasingly limited in the modern trend of mower design. In FIG. 4, nozzle 22 has a completely, open, circular profile 54.

Fitting 28, nipple 24, and tee fitting 30 are all hollow, each having a central water conducting opening communicating among the various hollow components. Nozzles 22 also have a central opening. The total or combined cross sectional areas of nozzles 22 are designed to be at least as great as the minimum cross sectional area of the central openings of fitting 28, nipple 24, and tee fitting 30. This maximizes the water flow through assembly 20, and delivers the most concentrated possible jet of water to blade 4.

It is to be understood that the present invention is not limited to the embodiments described above, but encompasses any and all embodiments within the scope of the following claims.

I claim:

1. A water distributing assembly for discharging water onto the rotating blade of a power mower having a deck, said assembly comprising a conduit further comprising a male threaded pipe nipple and a double female threaded fitting having means defining a passageway therethrough, communicating with said pipe nipple, said double female threaded fitting having means defining a connection port mating with a garden hose, said connection port having threads cooperating with corresponding threads formed in the garden hose, said double female threaded fitting connected to said pipe nipple thereabove, said pipe nipple disposed through the deck of the power mower, said double female threaded fitting for receiving water from a garden hose water source, and conducting said water through said deck to the blade of the mower, said conduit having:

an interior cross sectional area and at least one discharge nozzle having a second interior cross sectional area, the total of said second cross sectional area being at least as great as said cross sectional area of said conduit; and means for attaching said conduit to the mower;

said assembly further comprising a hollow tee fitting comprising a hollow stem member having threads corresponding and mating to said threads formed in said pipe nipple, said hollow tee being threaded thereto below the deck of the mower, and including two hollow cross members communicating with and extending from said hollow stem member and providing two of said nozzles, wherein said at least one discharge nozzle has a flattened profile, whereby momentum of water flowing through said discharge nozzles is increased.

2. The water distributing assembly according to claim 1, further comprising a removable cap for closing said connection port, having threads matingly corresponding with said threads formed in said connection port, whereby said threads formed in said connection port are covered when a garden hose is not connected thereto, and foreign matter is prevented from clogging said threads formed in said connection port.

3. The water distributing assembly according to claim 1, said conduit further comprising means defining a water outlet orifice formed therein, located upstream of said discharge nozzle.

4. A water distributing assembly for discharging water onto the rotating blade of a power mower having a deck, said assembly comprising:

a conduit further comprising a male threaded pipe nipple, a double female threaded fitting having means defining a passageway therethrough communicating with said pipe nipple, said double female threaded fitting having means defining a connection port mating with the garden hose, said connection port having threads cooperating with corresponding threads formed in the garden hose, said double female threaded fitting connected to said pipe nipple thereabove, said pipe nipple disposed through the deck of the power mower, said double female threaded fitting for receiving water from a garden hose water source, and conducting said water through said deck to the blade of the mower, and a hollow tee fitting comprising a hollow stem member having threads corresponding and mating to said threads formed in said pipe nipple and threaded thereto below the deck of the mower, and two hollow cross members communicating with and extending from said hollow stem member and providing two discharge nozzles, said conduit having means defining a water outlet orifice formed therein, located upstream of said discharge nozzles, said conduit further having an interior cross sectional area, at least one of said discharge nozzles having a flattened profile, whereby momentum of water flowing through said discharge nozzles is increased, each of said discharge nozzles having a second interior cross sectional area, the total of said second cross sectional areas of all of said nozzles being at least as great as said cross sectional area of said conduit;

means for attaching said conduit to the mower; and a removable cap for closing said connection port, having threads matingly corresponding with said threads formed in said connection port, whereby said threads formed in said connection port are covered when a garden hose is not connected thereto, and foreign matter is prevented from clogging said threads formed in said connection port.

5. A water distribution assembly for use with a deck of a power mower, comprising:

a male threaded pipe nipple disposed through the deck of the power mower;

a double female threaded fitting in fluid communication with and connected to said pipe nipple, said double female threaded fitting having a connection port to releasably connect with a garden hose, whereby said double female threaded fitting receives water through said connection port from a garden hose water source and conducts the water to said male threaded pipe nipple;

a hollow tee fitting having a hollow stem member in fluid communication with and connected to said pipe nipple, said hollow tee fitting including two hollow cross members extending from said hollow stem member, each of said cross members having a discharge nozzle, whereby said hollow stem member receives water from said pipe nipple and discharges the water through each said discharge nozzle of said cross members, each said discharge nozzle having a flattened profile, whereby momentum of water flowing through said discharge nozzles is increased; and means for attaching said pipe nipple to the deck of the power mower.

6. The water distributing assembly according to claim 5, further including a removable cap for closing said connection port, whereby when said connection port is closed, foreign matter is prevented from clogging said connection port.

* * * * *